(12) United States Patent
Rusch (10) Patent No.: US 8,973,178 B2
(45) Date of Patent: Mar. 10, 2015

(54) HEAT EXCHANGER

(75) Inventor: Christoph Rusch, Biel (CH)

(73) Assignee: Joulia AG, Biel (CH)

( * ) Notice: Subject to any disclaimer, the term of this patent is extended or adjusted under 35 U.S.C. 154(b) by 714 days.

(21) Appl. No.: 13/146,723

(22) PCT Filed: Feb. 4, 2010

(86) PCT No.: PCT/CH2010/000030
§ 371 (c)(1),
(2), (4) Date: Aug. 23, 2011

(87) PCT Pub. No.: WO2010/088784
PCT Pub. Date: Aug. 12, 2010

(65) Prior Publication Data
US 2011/0289674 A1 Dec. 1, 2011

(30) Foreign Application Priority Data
Feb. 6, 2009 (CH) .......................... 180/09

(51) Int. Cl.
| A47K 3/00 | (2006.01) |
|---|---|
| F28D 7/08 | (2006.01) |
| A47K 3/40 | (2006.01) |
| E03C 1/00 | (2006.01) |
| F24D 17/00 | (2006.01) |

(Continued)

(52) U.S. Cl.
CPC ... F28D 7/08 (2013.01); A47K 3/40 (2013.01); E03C 1/00 (2013.01); F24D 17/0005 (2013.01); F28D 1/06 (2013.01); F28D 21/0017 (2013.01); E03C 2001/005 (2013.01); *F24D 2200/16* (2013.01); *F24D 2200/20* (2013.01); *F28D 21/0012* (2013.01); *Y02B 30/18* (2013.01); *Y02B 30/566* (2013.01)
USPC .................................................. 4/613; 4/598

(58) Field of Classification Search
CPC ... E03C 2001/005; F28D 7/085; Y02B 30/18; F24D 17/005
USPC ............................................. 4/613, 602, 598
See application file for complete search history.

(56) References Cited

U.S. PATENT DOCUMENTS

| 4,085,728 A * | 4/1978 | Tomchak ....................... 126/669 |
| 4,150,787 A | 4/1979 | Braathen |
| 4,291,423 A * | 9/1981 | Wilson ............................. 4/598 |

(Continued)

FOREIGN PATENT DOCUMENTS

| DE | 2304537 | 8/1974 |
| DE | 3113784 | 10/1982 |

(Continued)

*Primary Examiner* — Janie Christiansen
(74) *Attorney, Agent, or Firm* — Rankin, Hill & Clark LLP (57) ABSTRACT

A heat exchanger for a shower tray can be arranged in the bottom of the shower tray for the heat recovery from wastewater so as to heat fresh water. To this end, the heat exchanger has a planar cover plate as the drain surface over which the wastewater drains. The cover plate forms the bottom of the shower tray, over which a lid that can be removed without the use of tools is arranged as a tread plate. The heat exchanger preferably includes a distributor element, which is arranged for distributing the wastewater over the drain surface. The distributor element is preferably a retaining element, which retains the wastewater at an upper edge of the drain surface and forms an overflow along the upper edge.

24 Claims, 4 Drawing Sheets

(51) Int. Cl.
*F28D 1/06* (2006.01)
*F28D 21/00* (2006.01)

(56) References Cited

U.S. PATENT DOCUMENTS

| | | | |
|---|---|---|---|
| 4,300,247 A | 11/1981 | Berg | |
| 4,304,292 A * | 12/1981 | Cardone et al. | 165/47 |
| 4,372,372 A | 2/1983 | Hunter | |
| 4,542,546 A | 9/1985 | Desgagnes | |
| 4,821,793 A | 4/1989 | Sheffield | |
| 2007/0227694 A1 | 10/2007 | Cederferm | |
| 2008/0060796 A1 | 3/2008 | Cai | |
| 2009/0218080 A1 | 9/2009 | McGregor | |
| 2010/0180374 A1 * | 7/2010 | Davoudi | 4/613 |

FOREIGN PATENT DOCUMENTS

| | | |
|---|---|---|
| DE | 3202910 | 8/1983 |
| DE | 3316704 | 12/1983 |
| DE | 3319638 | 12/1983 |
| DE | 3717720 | 12/1987 |
| DE | 3840534 | 6/1989 |
| DE | 3923511 | 2/1990 |
| DE | 3919543 | 12/1990 |
| DE | 3919544 | 1/1991 |
| DE | 4402269 | 6/1994 |
| DE | 4406971 | 10/1994 |
| DE | 19608404 | 5/1997 |
| DE | 19723148 | 12/1998 |
| DE | 19817031 | 10/1999 |
| EP | 0275237 | 7/1988 |
| ES | 2277493 | 7/2007 |
| ES | 2330284 | 12/2009 |
| FR | 2868795 | 10/2005 |
| GB | 1574327 | 9/1980 |
| GB | 2052698 | 1/1981 |
| GB | 2160628 | 12/1985 |
| GB | 2232749 | 12/1990 |
| GB | 2295666 | 6/1996 |
| GB | 2342146 | 4/2000 |
| GB | 2376517 | 12/2002 |
| GB | 2379006 | 2/2003 |
| GB | 2413841 | 11/2005 |
| GB | 2416829 | 2/2006 |
| GB | 2420973 | 6/2006 |
| GB | 2456570 | 7/2009 |
| NL | 8203332 | 3/1984 |
| NL | 1009927 | 2/2000 |
| NL | 1014030 | 7/2001 |
| NL | 1015561 | 1/2002 |
| NL | 1031082 | 8/2007 |
| SE | 526061 | 6/2005 |
| WO | 0112047 | 2/2001 |
| WO | 2006045153 | 5/2006 |
| WO | 2008155561 | 12/2008 |
| WO | 2009008826 | 1/2009 |
| WO | 2009101161 | 8/2009 |

* cited by examiner

HEAT EXCHANGER

BACKGROUND OF THE INVENTION

1. Field of the Invention

The invention relates to the field of heat exchangers and in particular to a heat exchanger for a shower installation and a shower tray, according to the preamble of the respective independent patent claims.

2. State of the Art

GB2416829A shows a heat exchanger for a shower tray, in which the waste water flows through a box, through which a meandering feed pipe with fresh water leads. In the embodiment of FIGS. 3-6, waste water flows via a heat exchanger box, whose surface is provided with ribs (21, 33) which act as flow inhibitors and effect a meandering course of the waste water across the heat exchanger.

In the heat exchanger of NL 1015561 C2, a tube for the fresh water is led through a channel with the waste water, wherein the waste water channel is shaped out in a plastic shell.

NL 1009927 C2 shows a heat exchanger, in which the waste water runs off via a cone-like sheet metal part with pipes with fresh water which are attached thereabove or therebelow. In another embodiment, the fresh water is led between two cone-like plates which are distanced from one another and via which the waste water runs away. This embodiment may, however, not withstand a high pressure of the fresh water, as is required according to the regulations of the respective authorities.

DE3319638A1 shows a heat exchanger which is inserted into a shower tray of the tray base. A spiral-shaped fresh water conduit is applied into a channel, through which the waste water flows away. In one embodiment, meandering flows are present, which are defined by bent plates and are separated from one another.

WO 2009/101161 A2 as well as WO 2008/155561 A1 likewise describe a heat exchanger arranged below a shower tray. Therein, tubes for feeding fresh water are arranged below the base of a shower tray and waste water flows around them on all sides.

What the heat exchangers from the state of the art have in common, is the fact that the manner in which the waste water is led, leads to a contamination of the waste water course, wherein this is difficult to clean.

BRIEF SUMMARY OF THE INVENTION

It is therefore the object of the invention, to provide a heat exchanger for a shower tray, and a shower tray of the initially mentioned type, which alleviate the disadvantages mentioned above. A further object is to provide a heat exchanger with an improved heat transfer.

These objects are achieved by a heat exchanger for a shower tray and a shower tray according to the features of the respective independent patent claims.

The heat exchanger for a shower tray may thus be arranged in the base of the shower tray for a heat recovery from waste water, for heating fresh water. Thereby, the heat exchanger comprises a plane cover plate with a run-off surface, via which the waste water runs away. This run-off surface, thus, forms a heat transfer surface or heat exchanger surface, and simultaneously also the base or a part of the base of the shower tray. Preferably, the waste water, after it has run away via this run-off surface, is no longer led via further heat exchanger surfaces in closed or difficultly accessible cavities, but into an outflow to the sewage system. With this, no cavities through which waste water flows and which could become contaminated or silt up, are present at the heat exchanger. The heat exchanger surface which is in contact with the waste water, and all regions (in front of the conventional discharge) in which waste water flows, are thus completely accessible and easy to clean. In other words: waste water flows over the heat exchanger only on its upper side, and the complete upper side or run-off surface is accessible, thus may be cleaned by hand without any special aids.

A lid is arranged above the run-off surface and serves as a foot surface or a foot plate for a user. The lid may preferably be removed by hand, thus without a tool, so that a very simple cleaning of the run-off surface or of the tray base is possible. The lid (single-part or multi-part) may be lifted from the tray or tilted upwards in a simple manner by hand, without actuating other elements. All regions of the shower tray, through which waste water flows, are accessible without tools and may be cleaned by hand without special aids by way of this.

In a preferred embodiment of the invention, the lid consists of several, in particular two individual parts. With this, it is possible for the use in each case to stand on one part of the lid, to remove the other part and to clean therebelow.

The surface of the heat exchanger which serves as a run-off surface is globally plane, which means that as a whole, seen over the whole surface, it is plane, but despite this may be locally profiled, for example with grooves.

Discharging waste water may flow over the complete upper surface of the heat exchanger and this may take up its heat, due to the flat design and the plane cover plate. A thin layer of the water running away may form due to the large and plane surface, wherein the heat transfer is likewise improved: a layering of the temperature forms with thick layers, wherein the water which is distanced from the heat exchanger surface is insulated by the water which is situated closer to it. Basically, the heat exchanger may also be applied in installations other than a shower tray, where warm water is required and used warm water flows off via the heat exchanger in a pressure-less manner. However, a particularly useful and space-saving design results in combination with a shower tray.

Preferably, the run-off surface, with the heat exchanger assembled in the shower tray, is not structured in the direction of the inclination of the run-off surface (run-off direction), so that a slight gradient is already sufficient to let the waste water discharge together with the entrained dirt. However, the run-off surface may comprise grooves or ribs which run in the run-off direction.

If the shower tray is manufactured of metal, for example of chrome steel—with or without a coating—then the cover plate is preferably formed in an integral manner with the shower tray, thus from the same metal plate, typically by way of deep-drawing. The remaining elements of the heat exchanger for leading the fresh water are fastened on this metal plate of the shower tray and are thermally coupled onto it, for example by way of soldering or welding.

If the shower tray is manufactured of a different material, for example ceramic or a plastic (as the case may be with fillers such as quartz sand), then the heat exchanger is preferably inserted into a frame of this other material and is grouted or bonded around the complete periphery, so that no waste water gets below the heat exchanger.

Preferably, the heat exchanger comprises a distributor element which is arranged for distributing the waste water over the run-off surface. The distributor element is preferably a retaining element which holds back the waste water at an upper edge of the run-off surface and forms an overflow along the upper edge. The retaining element is, thus, for example a channel or a retaining channel along the upper edge.

Thanks to the distributor element, the waste water runs off over the whole width of a preferably essentially rectangular run-off surface on the upper side of the heat exchanger. Thus a very large surface is available for the heat exchange. Since this surface is preferably not structured in the discharge direction (wherein however grooves or ribs may be present in the run-off direction), there are no obstacles at which water or contamination may collect. The surface is also very easy to clean.

The overflow is preferably formed by a multitude of distributor openings in the distributor element or by depressions (distributor channels) along the upper edge of the run-off surface. Additionally, the distributor element preferably comprises one or more comparatively small run-off openings which are arranged below the overflow and after the end of the flow of waste water effect a discharge of the waste water which has been retained behind the retaining element. Also, one or more run-off channels may be present instead of one or more run-off openings and these run-off channels may run more deeply than the overflow, thus in particular more deeply than the distributor channels and thus have the same effect as the described run-off openings.

The distributor element may be a section of a sheet-metal part which is bent up, from which sheet metal part a cover plate or a base or a core of the heat exchanger is formed. Alternatively, the distributor element may be shaped out as one piece on a lid which serves as a foot plate, thus as a downwardly projecting part of the lid which holds back the waste water in front of the run-off surface and distributes it.

The distributor element may, alternatively, be shaped out on the lid as one piece, by way of a retaining channel being shaped out on the lid itself, as a retaining element. This retaining channel already collects and distributes in the lid. Waste water running away out of the retaining channel runs away onto the run-off surface in a manner distributed over the length of the upper edge of the run-off surface of the heat exchanger. Here too, the retaining channel preferably comprises distributor channels or distributor openings which form individually defined run-off locations for the overflow to the run-off surface. In another alternative variation of the invention, the distributor element is shaped out as one piece on a tray base which is not part of the heat exchanger.

In a preferred embodiment of the invention, the distributor element in addition to the distributor openings comprises one or more safety overflow openings which are arranged higher and via which waste water may run away, in the case that the distributor openings may not accommodate the flow of the waste water—be it because the waste water quantity is too high or because the distributor openings are blocked. In the simplest case, the height of the distributor element may be such that an overflow gap is still present between the distributor element and the lower side of the lid. In this case, the overflow gap forms the safety overflow opening.

In a further preferred embodiment of the invention, the lid comprises support elements or support ribs, by way of which the lid is supported on the heat exchanger. The support ribs, for example, are integrally formed on the lid as one piece and are arranged preferably parallel to the flow of the waste water (run-off direction). By way of this, the lid may be removed as one part by hand, and the lid and the heat exchanger may be simply cleaned by spraying off.

The support ribs form obstacles or flow interrupters for the flow of waste water and edifies this, in another embodiment of the invention.

Preferably, the shower tray comprises an elongate, removable filter insert which is arranged in an edge region of the shower tray, wherein a longitudinal direction of the filter insert runs parallel to an edge of the shower tray, and the filter insert preferably in the longitudinal direction has an extension which is at least three times greater than perpendicular to this. The filter insert preferably has a laterally arranged hand grip for a simple removal. The filter insert may be arranged in a space-saving manner along the edge of the shower tray due to the elongate shape, and projects only slightly into a foot surface of the lid. The filter may also be arranged in the lid.

Preferably, an overflow channel is present, which is peripheral around an edge of the tray lower part and receives waste water which runs over the lid edge and leads it to the retaining element or distributor element and in particular to the filter insert. For this, the lid edge lies in the region of the overflow channel. In the case that the filter insert is blocked, the waste water may flow out of the overflow channel, through and below the lid, directly into the region of the heat exchanger. Alternatively or additionally, the waste water may be led to the distributor element through the lid itself, by way of this lid being slightly inclined or comprising recesses with an inclined base. Thereby, the waste water may only be led to one side of the shower tray or, if for example a heat exchanger is present with two sections which are inclined to one another, may be led to two opposite sides of the shower tray.

In further preferred embodiments of the invention, two or more heat exchangers of the described type are present in the base of the same shower tray. With this, the total construction height may be reduced given the same height and the same inclination of the run-off surfaces. Preferably, the two or more heat exchangers concerning the supply of fresh water are arranged in parallel. Thereby, an individual distributor element according to one of the described variations is present for preferably each of the several heat exchangers.

Further preferred embodiments are to be deduced from the dependent patent claims.

BRIEF DESCRIPTION OF THE DRAWINGS

The subject matter of the invention is hereinafter described in more detail by way of preferred embodiment examples which are represented in the attached drawings. In each case are shown schematically in:

FIG. 14a-f a plan view and different cross-sections through the same shower tray;

The reference numerals which are used in the drawings and their significance are listed in a conclusive manner in the list of reference numerals. Basically in the figures, the same parts have been provided with the same reference numerals.

DETAILED DESCRIPTION OF THE INVENTION

A preferred embodiment of the invention is explained by way of FIGS. 1 to 4: the shower tray 10 comprises an inserted heat exchanger 1 which is preferably connected in a fixed manner to the shower tray 10. A meandering course of a fresh water channel which runs below a cover plate 11 of the heat exchanger 1 is drawn dashed in FIG. 2. A lid 4 is inserted above the heat exchanger 1. A lid edge 42 may be bent downwards somewhat and lies in a peripheral overflow channel 31 on the edge of the shower tray 10. The overflow channel 31 leads waste water running away over the lid edge 42 to a filter insert 32 on a side of the shower tray 10. The lid 4 is supported by way of at least approximately perpendicular, downwardly directed support ribs 41. Thus a space is formed between the lid 4 and the heat exchanger 1, corresponding to the height difference which results due to the inclination of the heat exchanger 1 and a height difference which is necessary for the filter insert 32. Preferably, the overflow channel 31 and a space for mounting the filter insert 32 are shaped out on a single-piece tray lower part 3.

The filter insert 32 is not round, as is usual, but is designed in an elongate manner, for example at least three or four to at least six times longer than it is wide. It preferably comprises a laterally arranged hand grip for the simple removal. The filter insert 32 due to the elongate shape, may be arranged in a space-saving manner along the edge of the shower tray 10 and projects only very slightly into a foot surface of the lid 4.

Waste water running away through the filter insert 32 gets into a run-in region 33 in front of the heat exchanger 1. Here, the waste water is held back by a distributor element 2, wherein the distributor element 2 comprises an overflow, for example formed by a multitude of distributor openings 21 in a preferably at least approximately vertical block, or simply by way of a horizontal overflow. The effect of this overflow is that the waste water is firstly distributed in the run-in region 33, before it runs away over the overflow and over a run-off surface 17 on the upper side of the heat exchanger 1 on the heat exchanger 1.

Figure 7:
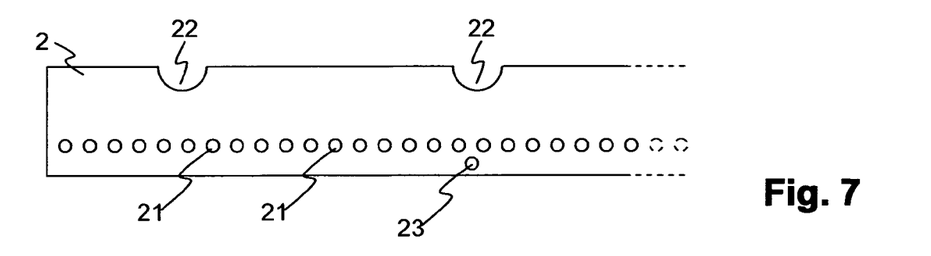
FIG. 7 a detail of a distributor element.

FIG. 7 shows a detail of a distributor element 2 in a preferred embodiment of the invention. Apart from distributor openings 21, here yet higher situated safety overflow openings 22 are shown, which become effective with an overload or blockage of the distributor openings 21. Moreover, individual run-off openings 23 are arranged below the safety overflow openings 22. These are located at the lower edge of the run-in region 33. With a typical waste water quantity, the throughflow through the run-off openings 23 in no way is sufficient, in order to empty the run-in region 33, so that the distributor openings 21 are effective. Only if practically water no longer continues to flow, do the run-off openings 23 have the effect that the part of the run-in region 33 lying below the distributor openings 21 empties.

The support ribs 41 preferably run in the run-off direction of the waste water, thus in the direction of the inclination of the heat exchanger 1 (or in the drop line or direction of the greatest gradient of the run-off surface 17). By way of this, on the one hand the flow of the waste water is not influenced in the ideal case, but if the heat exchanger 1 does not lie in a perfectly planar manner, water is prevented from running away only along one side of the heat exchanger 1 due to the support ribs 41.

After flowing away via the run-off surface 17, with which the waste water gives off heat to the heat exchanger 1, the waste water runs into a run-out region 34 of the tray lower part 3 and may be led away through a discharge (not shown). Due to the very flat construction manner of the heat exchanger, an installation in existing devices is however possible without significant adaptation.

The run-off surface 17 may comprise grooves in the run-off direction, wherein a depth of the grooves is for example 0.5 mm to 2 mm. The cover plate may thus be a flat plate which is structured or unstructured on the surface of its upper side, and is likewise plane or profiled on the lower side. A profile on the lower side may serve for supporting the plate, and/or for leading water which flows through the heat exchanger.

Figure 1:
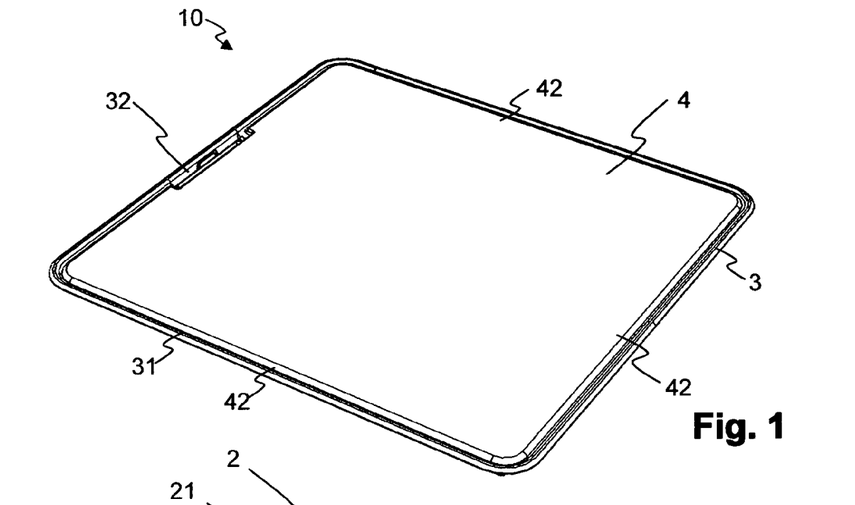
FIG. 1 a perspective view of a shower tray with a heat exchanger according to the invention.
Figure 2:
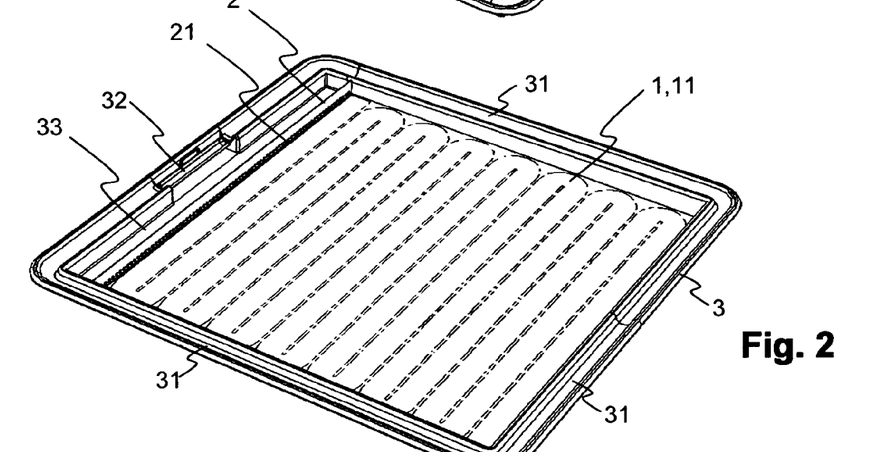
FIG. 2 the same view with a removed lid.
Figure 3:
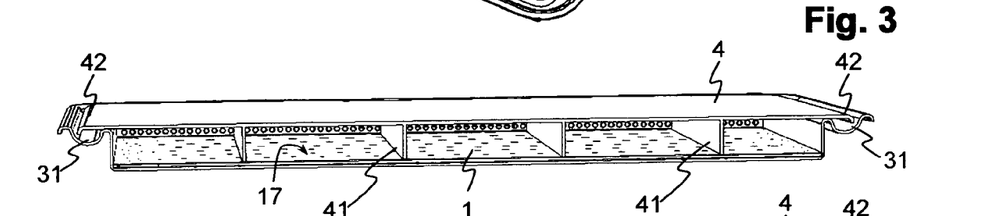
FIG. 3 a cross section through the shower tray.
Figure 4:
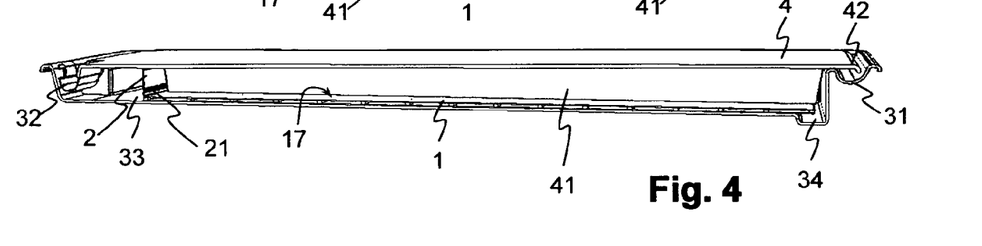
FIG. 4 a longitudinal section through the shower tray.
Figure 5:
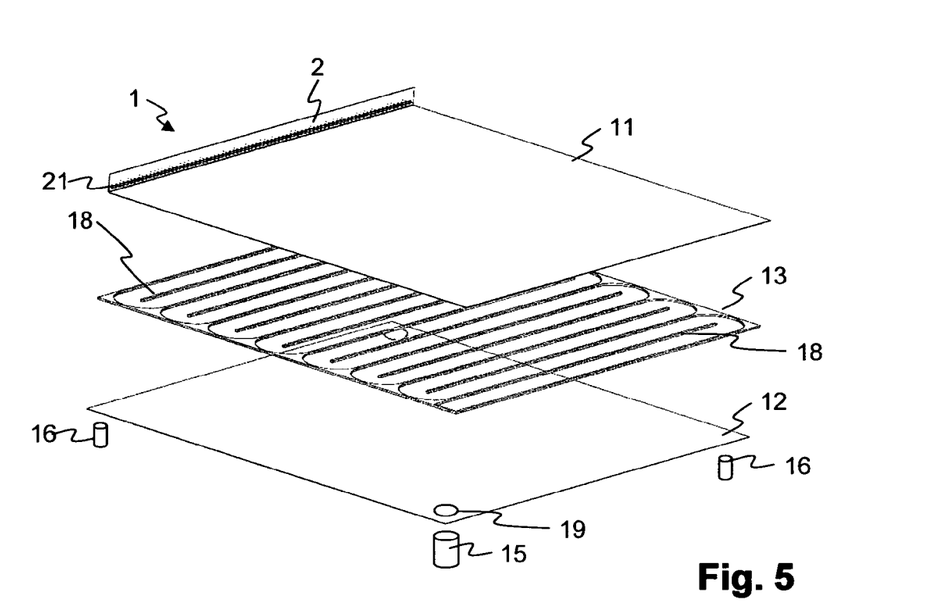
FIG. 5 an exploded drawing of a preferred embodiment of the heat exchanger.
Figure 6:
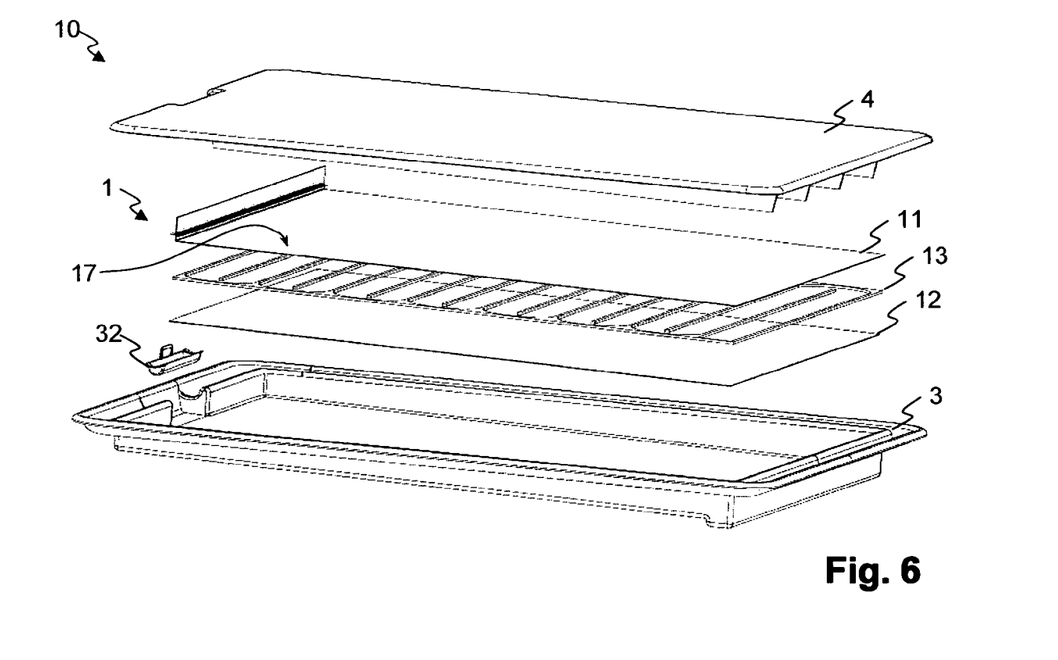
FIG. 6 an exploded drawing of a preferred embodiment of the heat exchanger, together with the shower tray.

FIG. 5 shows an exploded drawing of a preferred embodiment of the heat exchanger 1, and FIG. 6 shows an exploded drawing of the heat exchanger 1 as part of the complete shower tray 10. The heat exchanger 1 in this embodiment shows a cover plate 11, a base 12 and a core 13 lying therebetween. The cover plate 11 at an upper end comprises an angled part which forms the distributor element 2. In another embodiment of the invention, the distributor element 2 is formed on the base 12. Again in another embodiment, the distributor element 2 is part of the lid 4 and preferably is shaped out as one piece on the lid 4, either by way of it projecting downwards, at the same location as the distributor element 2 drawn in FIG. 5, or by way of it forming a retaining channel in the lid 4 as in FIG. 11.

The core 13 preferably comprises ribs 18 which define a meandering cavity which leads through the plane of the heat exchanger 1. The base 12 comprises connection openings 19, through which fresh water may flow into or out of the cavity. The base 12 at the connection openings 19 may be provided with connection unions 15 for the connection of fresh water conduits, as well as with bolts 16, by way of which the base 12 may be fastened on the tray lower part 3. The connection union 15 and the bolts 16, for example, lead through sealed openings in the tray lower part 3. The heat exchanger 1, preferably along its edge, and in particular at the run-in region 33, is connected to the tray lower part 3 via a seal, so that no water may flow under the heat exchanger. In a further embodiment of the invention, the heat exchanger 1, however, may be removed for cleaning purposes, as a rule not without a tool.

For the protection of the fresh water side of the heat exchanger 1, this may be provided with a pressure-relief valve, which, given an excess pressure, blows off the fresh water into the waste water region. Alternatively or additionally, a pressure reduction valve may be arranged in the fresh water supply conduit. By way of this, the large forces, which occur due to the water pressure at the large-surfaced cavities of the heat exchanger 1, are reduced.

Figure 8:
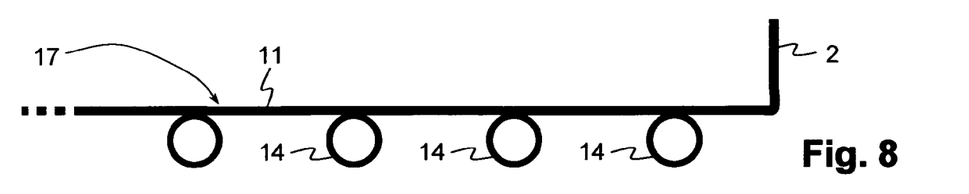
FIG. 8 a cross section through a part of a further preferred embodiment of a heat exchanger.

FIG. 8 schematically shows a cross section through a part of a further preferred embodiment of a heat exchanger. Here, the heat exchanger 1 again consists of a flat or plane cover plate 11. One or more meandering pipes 14 are attached below the cover plate 11, wherein a good heat transfer between the pipes 14 and the cover plate 11 exists, for example due to soldering. For example, here too a distributor element 2 is shown, which is integrally formed on the cover plate 11.

Figure 9:
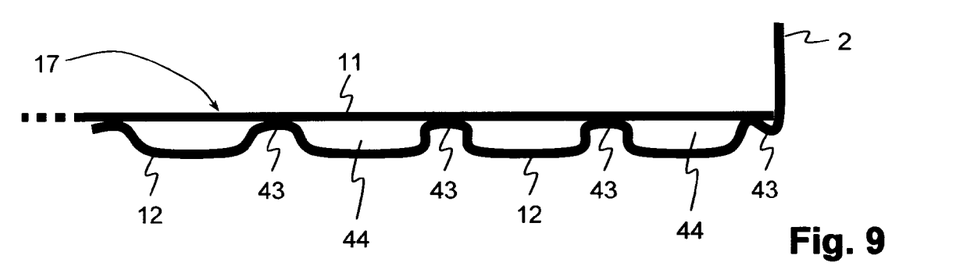
FIG. 9 a cross section through a part of another preferred embodiment of a heat exchanger.

FIG. 9 schematically shows a cross section through a part of another preferred embodiment of a heat exchanger. Here too, the heat exchanger 1 again consists of a flat or plane cover plate 11. However, instead of a core layer 13 being present, the base 12 is formed from one piece, so that when placing on the cover plate 11, on the one hand it forms connection regions 43 and on the other hand distanced regions 44, wherein the distanced regions form one or more preferably meandering channels for the fresh water. The cover plate 11 and the base 12 may preferably be connected to one another by way of welding or soldering in the connection regions 43. The distributor element 2 here is integrally formed on the base 12, so that only a single part needs to be re-shaped.

In a further preferred embodiment of the invention, the cover plate 11 as is shown in the FIGS. 8 and 9, is two-layered or multi-layered. E.g. an upper layer or part plate of chromium nickel steel is connected to a lower layer or part plate of copper or of a copper alloy. In turn, the base 12 or the pipes 14 are fastened on the lower layer. With this, as a whole several material layers are present, which separate the fresh water from the waste water, which is law in some countries.

Figure 10:
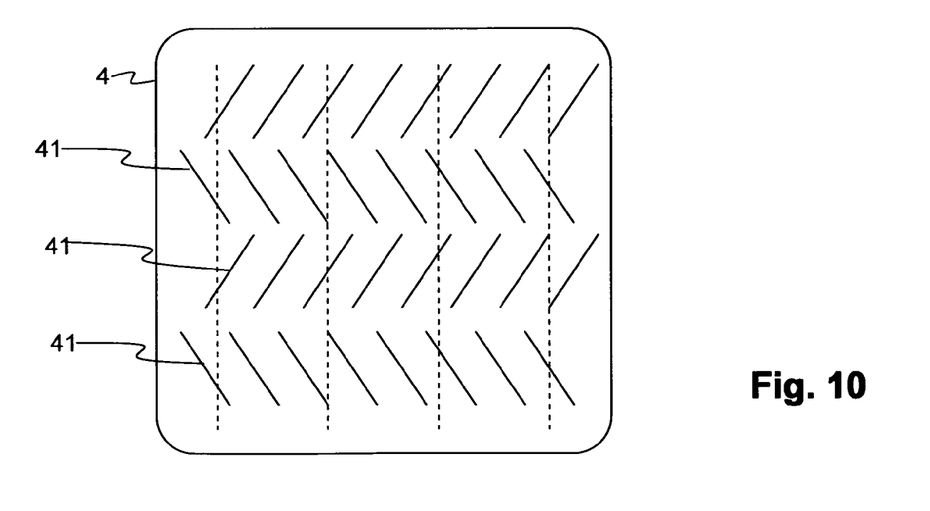
FIG. 10 another arrangement of supports of the lid.

FIG. 10 schematically shows another arrangement of support ribs 41 of the cover plate. The support ribs 41 here therefore do not (as drawn in a dashed manner) run parallel to the gradient of the heat exchanger 1 or of the run-off surface 17, but form flow disruptors or obstacles which effect an edification of the running-away waste water and thus an improved distribution of the flow of water over the run-off surface and an improved heat transmission.

Figure 11:
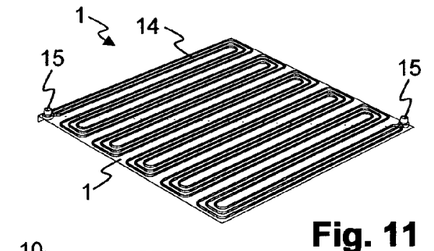
FIG. 11 a lower view of a preferred embodiment of a heat exchanger.

FIG. 11 shows a lower view of a preferred embodiment of a heat exchanger 1 with meandering pipes 14 corresponding to FIG. 8. Three pipes for leading the fresh water are connected in parallel between the connection unions 15. Alternatively, two or more pipes 14 connected in parallel may also be present. This embodiment of the invention with regard to the leading of the fresh water, as an alternative to the embodiments of FIGS. 8 and 9, may be infinitely combined with the embodiments with regard to the design of the shower tray 10.

FIGS. 12 to 14f show a further preferred embodiment of the invention in different views and sections. In this embodiment of the invention, on the one hand the lid 4 is preferably designed as one part and for distributing the waste water over the run-off surface 17. On the other hand and independently of this, the complete shower tray 10 is manufactured as one piece of a sheet-metal part, for example by way of deep-drawing, and the base of the shower tray 10 forms the run-off surface 17 and the upper heat exchanger surface. Such a shower tray 10 may thus also be combined with other lid shapes and such a lid 4 may also be combined with differently designed shower trays 10.

Figure 12:
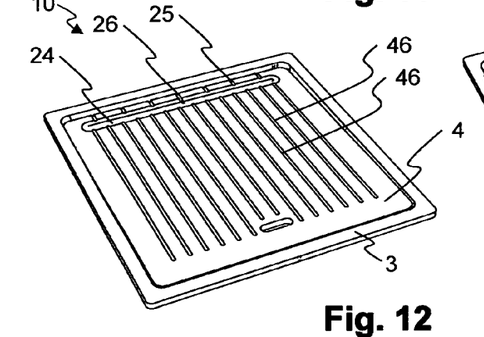
FIG. 12 a view of a shower tray in a further preferred embodiment, with an inserted lid, wherein the lid comprises an integrally formed distributor element.
Figure 13:
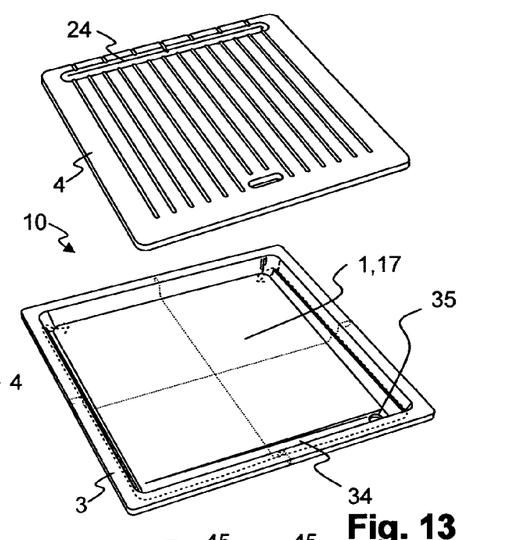
FIG. 13 the same shower tray with a lifted lid.

The lid 14 is provided with an integrally formed distributor element 2 in the form of a retaining channel 24. Distributor channels 25 lead out of the distributor element 2 or the retaining channel 24 over the edge of the distributor element 2. The waste water flows through the distributor channels 25, distributed along the upper edge of the heat exchanger 1, onto the run-off surface 17 of the heat exchanger 1. The surface of the lid 4 globally, thus seen over the whole lid 4, is essentially plane, but may however also be slightly cambered or inclined. Preferably, the lid 4 comprises recesses 46 which are formed therein, which lead the waste water over the lid 4 to the distributor element 2 or to the retaining channel 24. Several distributor channels 25, distributed along the upper edge of the run-off surface 17, lead out of the retaining channel 24, so that the waste water 26 which gets into the retaining channel 5 in a non-uniform manner is distributed uniformly over the run-off surface 17. Optionally, a run-off channel 26 is present, which is deeper than the distributor channels 25, or small openings as run-off openings are arranged (not drawn) in the base of the retaining channel 24, so that the retaining channel 24 may empty in a complete manner through these openings after showering. The lid 4 comprises a grip opening for the simple removal from the shower tray 10. A run-off region 34 which leads the waste water to the discharge 35 of the shower tray 10 (FIG. 13) runs along the lower end of the run-off surface 17.

Figures 14A, 14B:
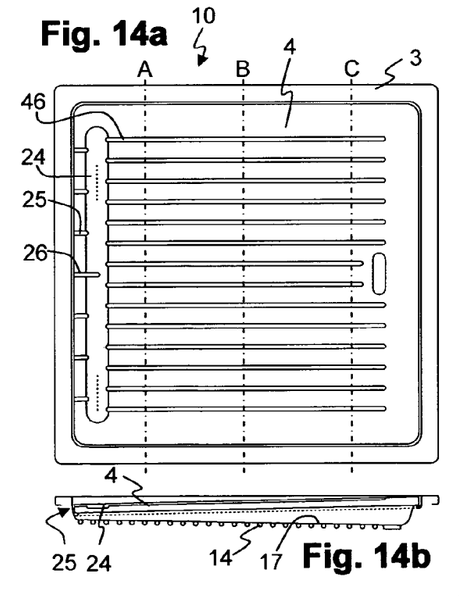
Figure 14C:
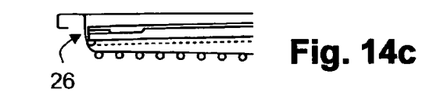
Figure 14D:
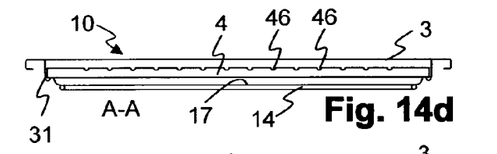
Figure 14E:
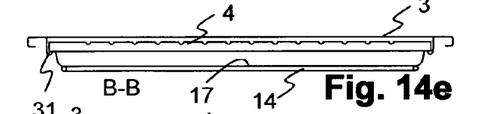
Figure 14F:
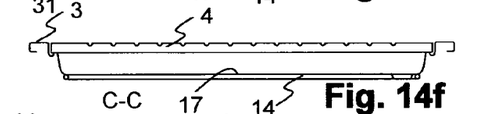

FIG. 14b shows a cross section through the same shower tray 10 and through a distributor channel 25. What may be easily seen is how the lid 4 drops off in the one direction, and the run-off surface 17 in the opposite direction. Instead of the pipes 14, a leading of the fresh water as in FIG. 5 or 9 may also be present. FIG. 14c shows a detail of a cross section through the run-off channel 26, said cross section being parallel to this. FIGS. 14d to 14f show sections parallel to the distributor channel 25. One may recognise how the lid 4, supported by an indentation in the shower tray 10, drops away in the direction of the distributor channel 25 and of the overflow towards the run-off channel 17. Outside the mentioned indentation, the overflow channel 17 runs along the edge of the lid 4 around the lid 4.

Figure 15:
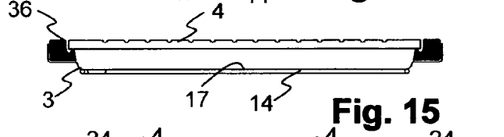
FIG. 15 a cross section through a heat exchanger with a solid frame.

FIG. 15 shows a cross section through a shower tray 10 with a, for example, solid frame 35 which is connected to the tray lower part 3 which in turn forms the heat exchanger 1, thus that the cover plate 11 of the heat exchanger 1 forms the base of the shower tray 10. The frame 36 here is open to the bottom, but may also be closed at the bottom as in the embodiment of the invention of FIG. 6.

Figure 16:
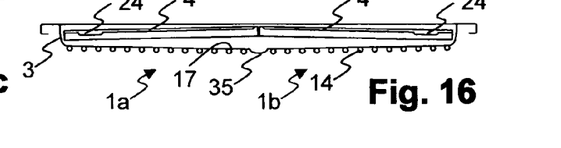
FIG. 16 a cross section through a shower tray with two heat exchangers and two lids.

FIG. 16 shows a cross section through a shower tray 10 with two heat exchangers 1a, 1b, in each case also with a lid 4 with an integrated distributor element 2 in the form of a retaining channel 24. Here, the two heat exchangers 1a, 1b are inclined to one another and the waste water gets into a common collection channel or run-out region 34 and from there into the discharge or run-off 35. In other preferred embodiments of the invention, the heat exchangers 1a, 1b are inclined away from one another, or more than two heat exchangers are present, for example in the form of four triangles with their tips lying on one another and which together form a rectangle corresponding the surface of the shower tray.

Figure 17:
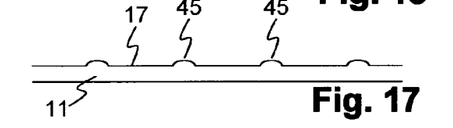
FIG. 17 a cross section through a run-off surface in a preferred embodiment of the invention.

FIG. 17 shows a cross section through the run-off surface 17 of the cover plate 11 in a preferred embodiment of the invention. The run-off surface 17 comprises fine, slightly raised ribs or guide ribs 45 which run in the direction of the drop of the run-off surface 17. The guide ribs 45 lead the waste water which is uniformly distributed by the distributor element 2, in controlled lanes, so that even with disturbances, a certain distribution of the waste water flow over the run-off surface 17 is maintained. The water layer remains thin and the heat transfer is improved by way of this.

LIST OF REFERENCE NUMERALS 1 heat exchanger
10 shower tray
11 cover plate
12 base
13 core
14 pipe
15 connection union
16 bolts
17 run-off surface
18 ribs
19 connection opening
2 distributor element
21 distributor opening
22 safety overflow opening
23 run-off opening 24 retaining channel
25 distributor channel
26 run-off channel
3 tray lower part
31 overflow channel
32 filter insert
33 run-in region
34 run-out region
35 discharge
36 frame
4 lid
41 support ribs
42 lid edge
43 connection region
44 distanced region, channel
45 guide rib
46 recess

The invention claimed is:

1. A shower tray comprising:
a heat exchanger,
wherein the heat exchanger is arranged below the shower tray for heat recovery from waste water for heating fresh water,
wherein a first heat exchanger surface is in contact with the waste water and a second heat exchanger surface is in contact with the fresh water,
wherein the first heat exchanger surface forms the base or a part of the base of the shower tray,
wherein the first heat exchanger surface serves as a run-off surface for the waste water over which the waste water flows, and wherein the first heat exchange surface is planar,
a lid is arranged above the first heat exchanger surface and serves as a foot surface or a foot plate for a user,
the lid is inclined in one direction, and the first heat exchanger surface is inclined in a direction opposite to the one direction.

2. The shower tray according to claim 1, wherein the heat exchanger has no cavities through which waste water flows.

3. The shower tray according to claim 1, wherein all regions of the shower tray through which waste water flows, are accessible without tools.

4. The shower tray according to claim 1, further comprising a lid which covers a surface of the heat exchanger and serves as a foot surface, wherein the lid may be removed from the shower tray without a tool.

5. The shower tray according to claim 4, further comprising a distributor element which is a retaining element which holds back the waste water along an upper edge of a run-off surface forming the first heat exchanger surface, and forms an overflow along this upper edge.

6. The shower tray according to claim 5, wherein the overflow is formed by a plurality of distributor openings or distributor channels in the distributor element or a retaining element along the upper edge of the run-off surface.

7. The shower tray according to claim 5, wherein the distributor element comprises at least one run-off opening which is arranged below the overflow, or a run-off channel which runs deeper than the overflow, and after completion of the waste water flow, effects a discharge of the waste water retained in the distributor element.

8. The shower tray according to claim 5, wherein the run-off surface and the first heat exchanger surface are shaped in an essentially rectangular manner.

9. The shower tray according to claim 5, wherein the distributor element is shaped out as one piece on the lid.

10. The shower tray according to claim 9, wherein the distributor element is designed as a retaining channel in the lid.

11. The shower tray according to claim 9, wherein the distributor element is a downwardly projecting part of the lid.

12. The shower tray according to claim 5, wherein the distributor element is shaped out on a tray lower part as one piece, wherein the tray lower part forms a frame for holding the heat exchanger and/or forms a base of the shower tray below the heat exchanger.

13. The shower tray according to claim 4, wherein the lid consists of two individually removable part lids, which in each case cover a part of the surface of the base of the shower tray.

14. The shower tray according to claim 5, wherein the lid has an essentially planar surface with recesses which are arranged therein and which lead the waste water to at least one distributor element in a region of one side of the lid.

15. The shower tray according to claim 4, wherein the lid comprises support elements by way of which the lid is supported on the heat exchanger.

16. The shower tray according to claim 15, wherein the support ribs are arranged parallel to the flow of the waste water.

17. The shower tray according to claim 15, wherein the support ribs form obstacles or flow interrupters for the waste water flow.

18. The shower tray according to claim 5, comprising an overflow channel which runs around an edge of a tray lower part and which receives waste water which flows over a lid edge of the lid and leads it to the distributor element.

19. The shower tray according to claim 1, comprising a plurality of heat exchangers.

20. The shower tray according to claim 1, comprising an elongate removable filter insert which is arranged in an edge region of the shower tray, wherein a longitudinal direction of the filter insert runs parallel to an edge of the shower tray, and the filter insert, in the longitudinal direction, has an extension which is at least three times larger than perpendicular thereto.

21. The shower tray according to claim 1, wherein said heat exchanger is adapted to be arranged in the base of the shower tray for a heat recovery from waste water for heating the fresh water, wherein the heat exchanger comprises a planar surface as a run-off surface, via which the waste water runs away.

22. The shower according to claim 21, further comprising a distributor element which is a retaining element which holds back the waste water along an upper edge of a run-off surface forming the first heat exchanger surface, and forms an overflow along this upper edge, and wherein the distributor element is a bent-up section of a sheet metal part, from which sheet metal part a cover plate or a base or a core of the heat exchanger is formed.

23. The shower tray according to claim 21, wherein the run-off surface comprises grooves or ribs that run in a direction of inclination of the run-off surface.

24. The shower tray according to claim 21, wherein the run-off surface is not structured in a run-off direction.

* * * * *